B. NÖLDNER.
PNEUMATIC TIRE.
APPLICATION FILED JAN. 2, 1907.
917,889.
Patented Apr. 13, 1909.
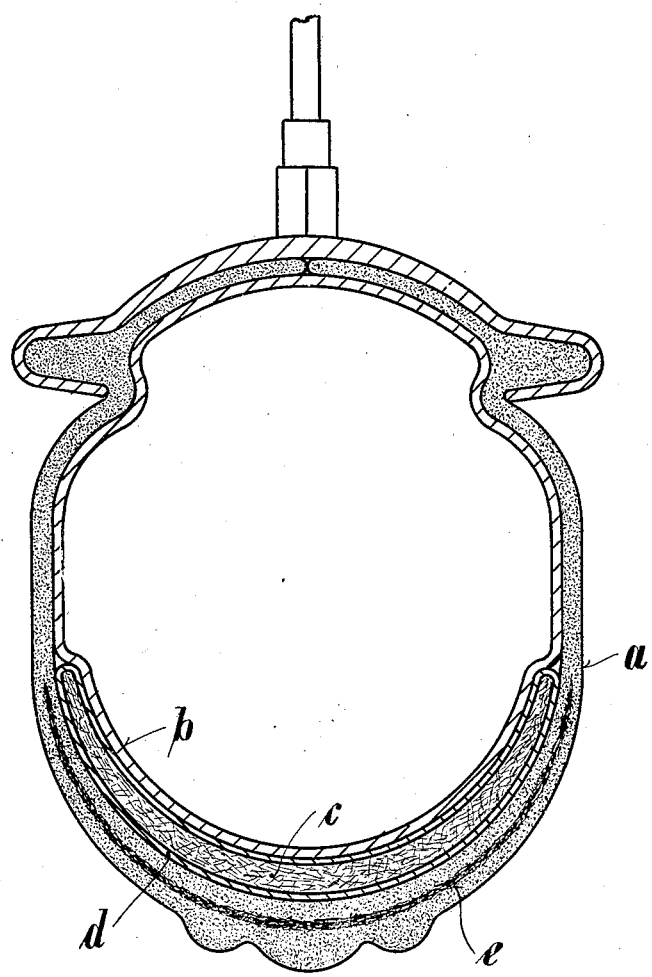

UNITED STATES PATENT OFFICE.

BRUNO NÖLDNER, OF BRESLAU, GERMANY.

PNEUMATIC TIRE.

No. 917,889.  Specification of Letters Patent.  Patented April 13, 1909.

Application filed January 2, 1907. Serial No. 350,372.

*To all whom it may concern:*

Be it known that I, BRUNO NÖLDNER, a subject of the Emperor of Germany, residing a 18 Ohlauerstrasse, Breslau, Germany, have invented certain new and useful Improvements in Pneumatic Tires; and I do hereby declare the following to be a full, clear, and exact description of the invention, such as will enable others skilled in the art to which it appertains to make and use the same.

The employment of thick sheets of mica as a protective layer for preventing the puncturing of pneumatic tires is already known.

The present invention consists in employing the mica in the form of small thin laminated sheets as a protective lining or band. These small sheets of mica even when placed one above the other in a thick layer have great flexibility and adapt themselves to the slightest change in the form of the pneumatic tire. Thus when used as a means of preventing the destruction of the air-tube they offer no resistance either to the latter or to the outer cover, that could have a destructive action thereon and notwithstanding that they are only placed in a thin layer have the property of presenting a sufficient resistance to sharp or pointed objects. This action of the mica, which in itself is known, is considerably increased when the mica is employed in the form of small thin sheets for wheel tires and the like, owing to the mica neither forming nor finding any rigid abutment. A pointed body which penetrates the outer cover therefore finds a resistance in the laminated layer of mica and in consequence of the flexibility of the laminated layer of mica the pneumatic tire and the layer of mica yield to the pressure of the penetrating body, without the layer of mica being broken through and therefore preventing injury to the air-tube.

The application of the laminated layer of mica to a wheel tire is illustrated in the accompanying drawing which is a transverse section of a pneumatic tire constructed according to this invention.

The outer cover of the wheel is indicated by $a$ and the air-tube by $b$. The mica $c$ in the form of small thin sheets is placed in a covering or sheath $d$ of any suitable material and interposed between the tread of the outer cover $a$ and the air-tube $b$. The advantage of this arrangement of the laminated layer of mica $c$ is that it can be applied to any wheel without altering the air-tube or the outer cover. The same object can also be attained if the layer of mica be embedded in the outer cover $a$ as likewise illustrated in the drawing, in which $e$ is the layer of mica embedded in the material forming the outer cover.

What I claim and desire to secure by Letters Patent is:—

A pneumatic tire comprising separable inner and outer tubes, an independent hollow sheath or covering interposed between said tubes marginally around the tire, thin laminated sheets of the mica inclosed in said sheath and extended through the whole area of the tread of the tire said sheets being freely movable relatively, and laminated sheets of mica embedded in the outer tube and extending over the tread area and decreasing in thickness from the apex of the tread to their marginal edge.

In testimony whereof I have affixed my signature, in presence of two witnesses.

BRUNO NÖLDNER.

Witnesses:
 FRANK KATZ,
 ERNST BLEISCH.